United States Patent
Berg et al.

(10) Patent No.: US 11,777,801 B1
(45) Date of Patent: *Oct. 3, 2023

(54) CHANGE MANAGEMENT SYSTEM WITH MONITORING, ALERTING, AND TRENDING FOR INFORMATION TECHNOLOGY ENVIRONMENT

(71) Applicant: United Services Automobile Association (USAA), San Antonio, TX (US)

(72) Inventors: Donald Nelson Berg, Destin, FL (US); David Owens, Holly Springs, MS (US); James Austin Adams, San Antonio, TX (US); Thomas Alexander Hoffman, Grapevine, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/944,160

(22) Filed: Sep. 13, 2022

Related U.S. Application Data

(63) Continuation of application No. 17/085,028, filed on Oct. 30, 2020, now Pat. No. 11,477,077.
(Continued)

(51) Int. Cl.
| | |
|---|---|
| *H04L 41/0816* | (2022.01) |
| *H04L 41/085* | (2022.01) |
| *H04L 41/0806* | (2022.01) |
| *H04L 41/0604* | (2022.01) |
| *H04L 41/0866* | (2022.01) |
| *H04L 41/0893* | (2022.01) |
| *G06F 11/30* | (2006.01) |

(52) U.S. Cl.
CPC ...... *H04L 41/0816* (2013.01); *G06F 11/3079* (2013.01); *H04L 41/0613* (2013.01); *H04L 41/085* (2013.01); *H04L 41/0806* (2013.01); *H04L 41/0866* (2013.01); *H04L 41/0893* (2013.01)

(58) Field of Classification Search
None
See application file for complete search history.

(56) References Cited

U.S. PATENT DOCUMENTS

| | | |
|---|---|---|
| 11,477,077 B1 | 10/2022 | Berg et al. |
| 2009/0037481 A1 | 2/2009 | Baker |

(Continued)

*Primary Examiner* — Joshua Joo
(74) *Attorney, Agent, or Firm* — Perkins Coie LLP

(57) ABSTRACT

An information technology (IT) network includes configuration items (CIs) that may constantly change, where the CIs describe hardware components or software components that are configured to operate on the IT network. A system comprising a server can determine a change associated with a CI, send, to a configuration management database (CMDB), a message that updates the CMDB based on the determined change associated with the CI, determine, for the CI, a monitor configuration that describes one or more variables and corresponding one or more parameters with which the CI is to be monitored, and send the CI with the monitor configuration to a plurality of monitoring software tools operating on a plurality of servers, where each monitoring software tool is configured to monitor the CI based on the monitor configuration.

20 Claims, 7 Drawing Sheets

Related U.S. Application Data

(60) Provisional application No. 62/928,275, filed on Oct. 30, 2019.

(56) References Cited

U.S. PATENT DOCUMENTS

| | | | |
|---|---|---|---|
| 2010/0052924 A1* | 3/2010 | Bajpay | H04L 41/0631 340/635 |
| 2010/0180041 A1* | 7/2010 | Thomas | G06Q 10/107 709/230 |
| 2012/0017165 A1* | 1/2012 | Gardner | H04L 41/22 715/771 |
| 2012/0204151 A1* | 8/2012 | Ientile | G06F 8/71 717/121 |
| 2014/0096115 A1* | 4/2014 | Guan | G06F 8/41 717/140 |
| 2014/0280268 A1 | 9/2014 | McKay | |
| 2014/0325290 A1* | 10/2014 | Gutjahr | G06F 11/079 714/48 |
| 2015/0229518 A1* | 8/2015 | Ennis | H04L 41/145 709/224 |
| 2016/0210172 A1* | 7/2016 | Ramachandra | G06F 9/5072 |
| 2017/0010948 A1* | 1/2017 | Kumar | G06F 11/3093 |
| 2017/0048109 A1* | 2/2017 | Kant | H04L 41/147 |
| 2017/0085447 A1* | 3/2017 | Chen | H04L 43/024 |
| 2018/0234480 A1* | 8/2018 | Rezvani | H04L 41/0813 |
| 2019/0028332 A1* | 1/2019 | Ding | H04L 41/0869 |
| 2019/0124122 A1* | 4/2019 | Barday | H04L 63/04 |
| 2019/0205153 A1* | 7/2019 | Niestemski | G06F 9/5077 |
| 2019/0215236 A1 | 7/2019 | Jain et al. | |
| 2019/0236061 A1* | 8/2019 | Jurowicz | G06F 16/2365 |
| 2020/0084086 A1 | 3/2020 | Gupta et al. | |
| 2020/0169473 A1* | 5/2020 | Rimar | H04L 41/0806 |
| 2020/0334080 A1 | 10/2020 | Ari et al. | |
| 2021/0126974 A1* | 4/2021 | Chau | H04L 41/145 |

\* cited by examiner

CHANGE MANAGEMENT SYSTEM WITH MONITORING, ALERTING, AND TRENDING FOR INFORMATION TECHNOLOGY ENVIRONMENT

CROSS-REFERENCE TO RELATED APPLICATIONS

This application is a continuation of U.S. patent application Ser. No. 17/085,028, filed on Oct. 30, 2020, entitled "CHANGE MANAGEMENT SYSTEM WITH MONITORING, ALERTING, AND TRENDING FOR INFORMATION TECHNOLOGY ENVIRONMENT," which claims priority to U.S. Provisional Application No. 62/928,275, filed on Oct. 30, 2019, entitled "CHANGE MANAGEMENT SYSTEM WITH MONITORING, ALERTING, AND TRENDING FOR INFORMATION TECHNOLOGY ENVIRONMENT," which are both hereby incorporated by reference in their entireties for all purposes.

TECHNICAL FIELD

This disclosure is directed generally to systems, methods, and apparatuses for monitoring and alerting based on changes made in an information technology environment.

BACKGROUND

An information technology (IT) network includes hardware and software components that are designed to provide users with information or content requested by the users. For example, applications operating on servers can allow a user to sign up for services or to perform a search via a web browser operating on the user's computer. In some cases, however, some of the hardware and software components in an IT network can malfunction or generate error messages that can prevent the IT network from providing information or content requested by users or from processing data as part of its normal operation. Engineers manage IT networks using monitoring software tools that alert, the engineers of failure or issues with the hardware or software component.

Figure 1:
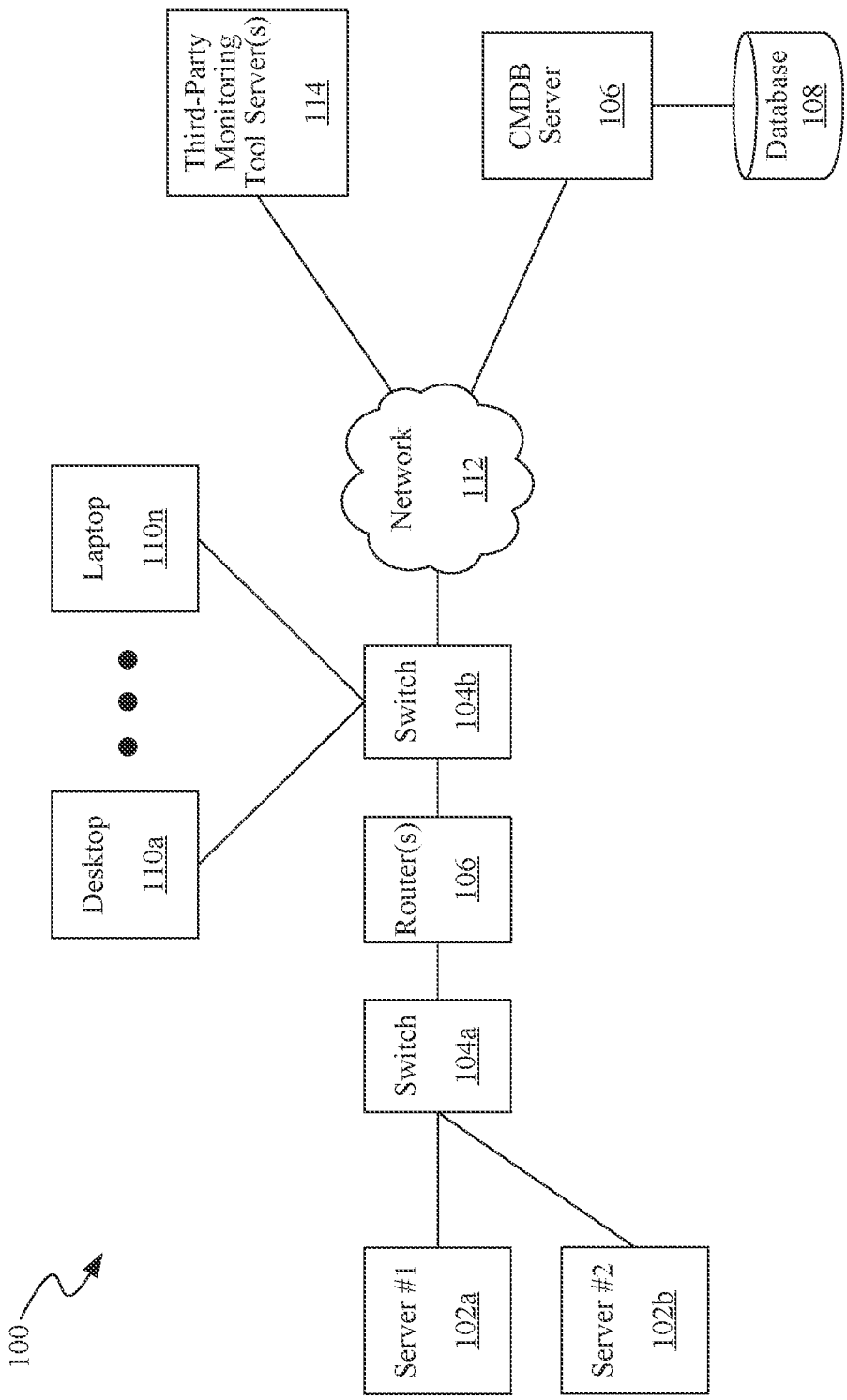
FIG. 1 shows an example change management system in an information technology (IT) network or computing network.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

A Configuration Management Database (CMDB) is used in an IT network to keep track of hardware and software components. The CMDB includes data known as configuration items (CI) that describes the hardware and/or software components operating in an IT network. For example, if a new CI such as a server or database or web service is added to an IT network, the health of the new CI can be monitored. For example, for a CI relating to a server, a monitoring software tool can monitor the server's CPU's utilization so that if the CPU utilization exceeds a pre-determined threshold value, the monitoring software tool can send an alert to an engineer managing the IT network.

Conventional CMDB and monitoring software tools have several technical problems. One technical problem with conventional monitoring software tools is that they require significant configuration to operate with an IT network. In some cases, several monitoring software tools need to be configured to with the IT network and integrated with each other so that the IT network can be adequately maintained. Another technical problem with conventional CMDB is that it is designed as an infrastructure for physical items and not for software related changes or software related CIs. A third technical problem with conventional CMDB and monitoring software tools is that the system does not automatically assign appropriate monitoring for new CIs added to an IT network or updated CIs in the IT network based on a class to which the CIs belong.

To overcome at least some of these technical problems, this patent document describes techniques to discover or determine changes with CIs, update CMDB, monitor, generate events, generate alerts, and/or escalate alerts. This patent document first provides an overview of the IT network in which the CIs can be changed. The example techniques to determine that a CI has been changed (e.g., added, removed, or updated), to update the CMDB associated with the changed CI, and to determine a monitoring configuration for the changed CI are further described in Section I. For example, for a CI that is added or updated, the example techniques can determine that the CI has been changed, update the CMDB, and determine a monitoring configuration (e.g., a default or baseline monitoring configuration) that includes one or more variables and corresponding parameters with which the health of the CI can be monitored. The monitoring configuration can be based on a type or class to which the newly added or updated CI belongs. The example techniques to send monitoring configuration to multiple third-party monitoring software tools are further described in Section II. The example techniques to manage alerts sent by one or more third-party monitoring software tools are further described in Section III. And, the example techniques to track events associated with a CI are described in Section IV.

An example method for managing CIs in an IT network includes a server configured to determine a change associated with a CI configured to operate in an IT network, where the CI describes a hardware component or a software component that is configured to operate in the IT network; send, to a CMDB (i.e., database), a message that updates the CMDB based on the determined change associated with the CI; in response to the CI being updated in the CMDB determine, for the CI, a monitor configuration that describes one or more variables and corresponding one or more parameters with which the CI is to be monitored; and send the CI with the monitor configuration (e.g., default or baseline monitoring configuration) to a plurality of monitoring software tools operating on a plurality of servers, where each monitoring software tool is configured to monitor the CI based on the monitor configuration. In some embodiments, the plurality of monitoring software tools can send a plurality of alert messages to the server, where the server can determine, by analyzing contents of the plurality of alert messages, that at least some of the plurality of alert messages describe the critical or dangerous condition of the same CI. If at least some of the alert messages relate to the same CI, the server can generate and send a single alert message for the CI to one or more computers or to one or more messaging services associated with one or more persons that maintain or manage the CI.

FIG. 1 shows an example change management system 100 in an IT network or computing network. The example change management system 100 includes an IT network comprising servers 102a, 102b and computers 110a-110n in communication with the CMDB server 106 via one or more switches 104a, 104b and/or one or more routers 106. The database 108 (e.g., CMDB) stores the CIs. CIs can include hardware or software components, such as servers, databases, web services, laptops, networking devices (e.g., router, switch), phones, and/or virtual machines (e.g., Java virtual machine (JVM)). The different types of CIs can be organized by classes. For example, servers may be classified as in server class, routers and switches may be classified in a networking class, and web services may be classified in a web service class. Thus, the database 108 can include a list of the CIs along with their corresponding classes. A hardware or software component can have more than one CI associated with it.

As further described in this patent document, the various modules (shown in FIG. 5) of the CMDB server 106 can (1) discover whether a CI has been changed (e.g., added, removed or updated), update the information associated with the CI in the CMDB with the information associated with the changed CI, (2) update a monitoring configuration for an updated CI with third-party monitoring software tools, (3) manage alerts sent by third-party monitoring software tools, and (4) manage events associated with CIs. Each of these technical features are further described in this patent document below. The example headings for the various sections below are used to facilitate the understanding of the disclosed subject matter and do not limit the scope of the claimed subject matter in any way. Accordingly, one or more features of one example section can be combined with one or more features of another example section.

I. CMDB Application Mapping

The OMB server 106 includes a CMDB application mapping module (shown as 544 in FIG. 5) that can discover whether a CI has been changed (e.g., added or updated) and can determine a monitoring configuration for the changed CI. For example, a new CI may be a new NM that was added to the IT network. In this example, when the CMDB application mapping module determines that the new CI is added to IT network, the CMDB application mapping module determines a monitoring configuration (e.g., default or baseline monitoring configuration) for the new CI, creates one or more monitoring configuration payloads with the new CI, sends the new CI with the monitoring configuration to one or more third-party monitoring software tools operating on one or more servers 114, and sends a message to the database 108 to add the new CI to the database 108. The third-party monitoring software tools can be provided by, for example, Splunk or AppDynamics, and can perform log aggregation related operations to identify relevant text within logs associated with CIs. The CMDB application mapping module can communicate and integrate with one or more third-party monitoring software tools operating on one or more servers 114.

In another example, the CMDB application mapping module can determine that a CI has been updated, determine a monitoring configuration for the updated CI, create customized monitoring configuration payloads with the new CI, send the updated CI with the monitoring configuration to one or more third-party monitoring software tools operating on one or more servers 114 via the customized monitoring configures payloads, and send a message to the database 108 to update a previous version of the CI stored within the database 108 with the updated CI.

The CMDB application mapping module can employ machine learning techniques to determine that a CI within an IT network has changed. For example, CMDB application mapping module can use machine learning techniques to scan software code or log messages (e.g., log error message) associated with CIs to detect changes associated with the CIs. The CMDB application mapping module can employ at least two techniques to detect changes associated with the CIs. In a first example technique, the CMDB application mapping module can scan the software code associated with the CI. The software code can be structured so that a machine learning algorithm can parse the actual base code looking for key terms associated with, for example, databases and or web services. The presence of key terms within the software code can indicate changes made with respect to the CI. For example, the machine learning algorithm operating as part of the CMDB application mapping module can search for key letters before and after a text using RegEx and can extract from the software code the text in between that includes the CI name or the web service name.

Figure 2:
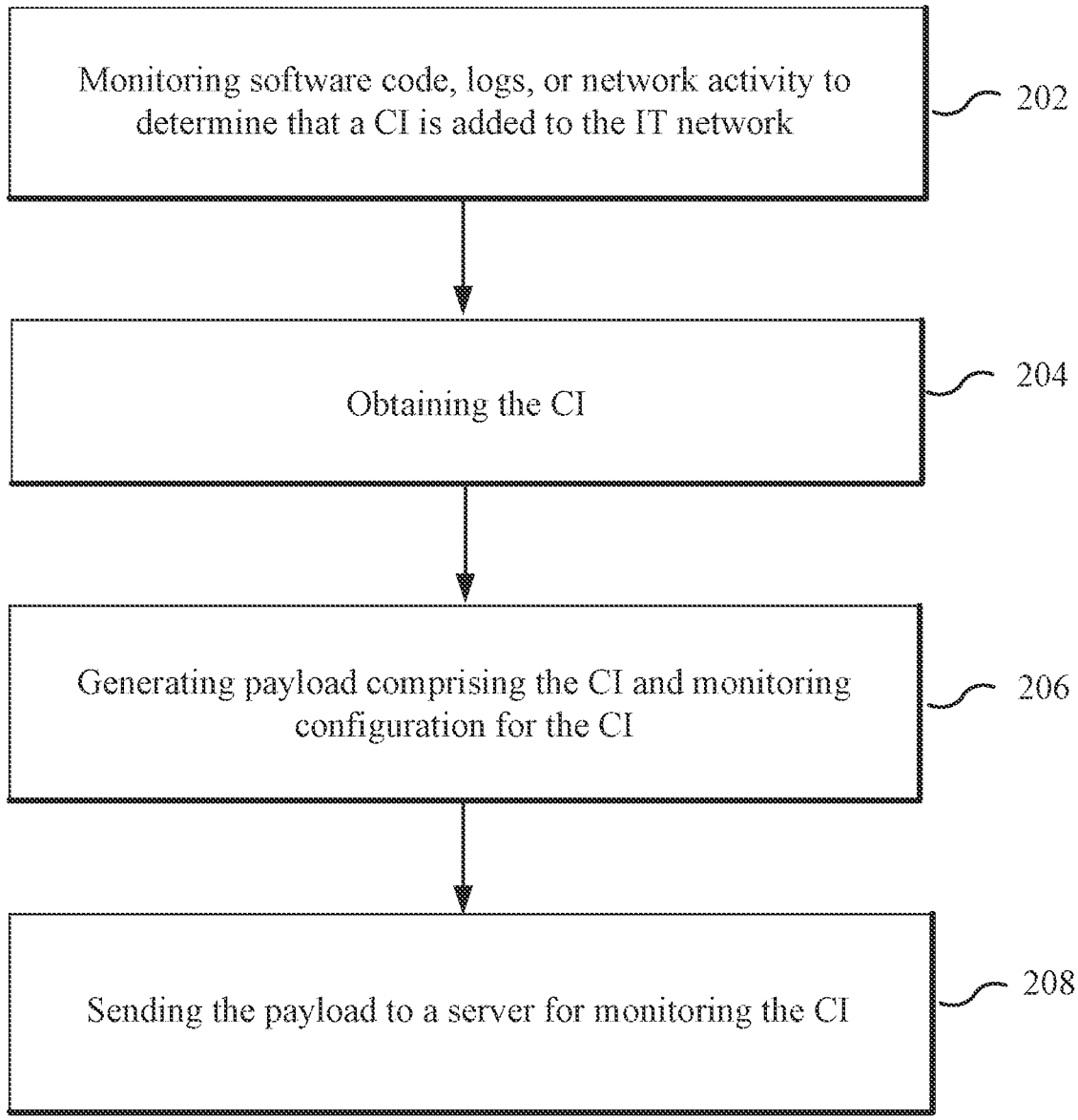
FIG. 2 shows an example discovery process performed by a configuration management database (CMDB) application mapping module for a configuration item (CI) newly added to an IT network.

In a second example technique, the CMDB application mapping module can scan a log message by querying the logs and look for new messages or key terms that are coming through from new sources, from new CIs that have not been discovered before. The presence of key terms within the log message can indicate changes made with respect to the CI. If the CMDB application mapping module detects a new CI in a log message, the CMDB application mapping module can send the new CI to be added to the database 108. When the CMDB application mapping module detects a change with a CI (e.g., a CI is added or updated or removed), the CMDB application mapping module can send a message to update the database 108. The key terms with which the CMDB application mapping module parses the software code or queries the log message can be determined by machine learning techniques, for example, based on training data provided to the CMDB application mapping module. In some embodiments, training data can be stored in a storage device (e.g., hard drive) located within the CMDB server 106. In some embodiments, a CMDB application mapping module can determine that a CI is newly added in the IT network based on receiving, from the database 108 (i.e., CMDB), a message that indicates that the CI is newly added to the CMDB FIG. 2 shows an example discovery process performed by a CMDB application mapping module for a CI newly added to an IT network. At the monitoring operation 202, a CMDB application mapping module can monitor software code, logs, or network activity associated with a CI to determine that the CI (e.g., a hardware component or a software component) has been added to the IT network. For example, the CMDB application mapping module may determine that a CI is newly added and configured to operate in an IT network by parsing a software code or a log message associated with the CI and by identifying presence of one or more key terms within the software code or the log message. The presence of one or more key terms within the software code or the log message can indicate that the CI has been newly added. In some embodiments, a machine learning model can provide the key term with which the CMDB application mapping module can parse the software code or the log message.

At the obtaining operation 204, the CMDB application mapping module can obtain the CI. At the generating operation 206, the CMDB application mapping module can generate a payload comprising the CI and a monitoring configuration (e.g., default or baseline monitoring configuration) for the CI. Each software monitoring tool can require a separate payload and thus the system can generate several payloads. The CMDB application mapping module can determine the monitoring configuration for the CI based on a class to which the CI belongs. The CMDB server can store a default or baseline monitoring configuration for each of the CI classes. In an example embodiment, the CMDB application mapping module can retrieve a pre-defined default monitoring configuration based on the type or class of CI added to the IT network. A monitoring configuration can include one or more variables and corresponding one or more parameters (e.g., one or more values) with which one or more third-party monitoring software tools can monitor the CI. For example, if a CI belongs to a server class, then the monitoring configuration can include a variable name such a CPU utilization with associated parameter having a threshold value of 80%, a variable name such as memory utilization can have a parameter having associated threshold value of 90%, etc. In some embodiments, the system can generate (or a user can specify) a specific monitoring configuration for a CI rather than have the monitoring scheme based on the class of the CI.

At the sending operation 208, the CMDB application mapping module sends the generated payload(s) to one or more third-party monitoring software tools operating on one or more servers (e.g., 114 in FIG. 1) so that the one or more third-party monitoring software tools can monitor the CI based on the monitoring configuration.

Figure 3:
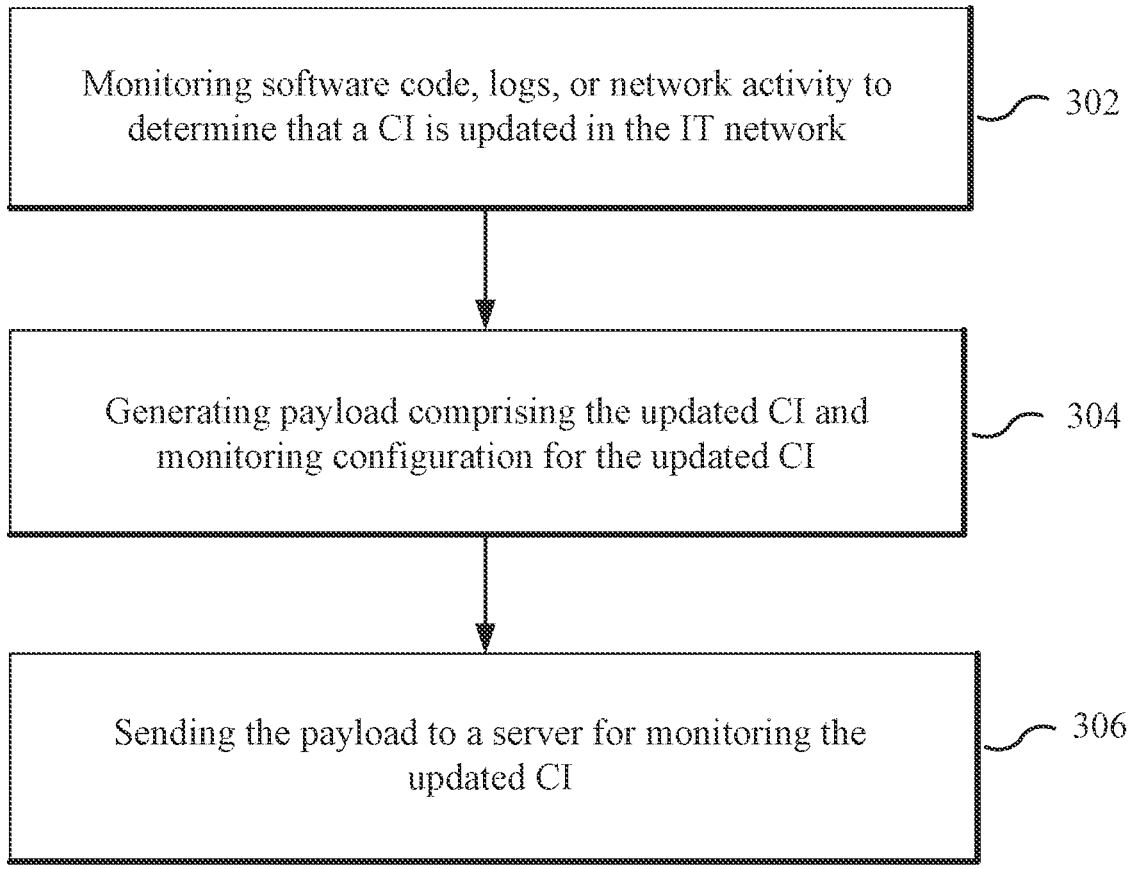
FIG. 3 shows an example discovery process performed by a CMDB application mapping module for an updated CI in an IT network.

FIG. 3 shows an example discovery process performed by a CMDB application mapping module for an updated CI in an IT network. At the monitoring operation 302, a CMDB application mapping module can monitor software code, logs, or network activity associated with a CI to determine that the CI has been updated in the IT network based on techniques described in this patent document, e.g., at least in FIG. 2. For example, the CMDB application mapping module can determine that the CI is updated by comparing the software code to a previous version or a default version of the software code. In an example implementation, the CMDB application mapping module can search for values associated with a pre-determined number of key terms within the software code of the CI and the previous software code of the CI to determine whether the values have changed. If the CMDB application mapping module determines that the values associated with the key terms have changed, then the CMDB application mapping module can determine that the CI has been updated At the generating operation 304, the CMDB application mapping module can generate one or more payloads comprising the updated CI and a monitoring configuration (e.g., default or baseline monitoring configuration) for the updated CI. The CMDB application mapping module can determine the monitoring configuration for the updated CI based on a class to which the updated CI belongs. At the sending operation 306, the CMDB application mapping module sends the generated payload to one or more third-party monitoring software tools operating on one or more servers (e.g., 114 in FIG. 1) so that the one or more third-party monitoring software tools can monitor the updated CI based on the monitoring configuration.

The techniques described in Section I for the CMDB application mapping module can beneficially allow the CMDB application mapping module to track and update the CMDB database for software related changes for CIs. The CMDB application mapping module can allow a CI to map up to a container and down to other CI's running within the current CI. The CI's can be managed as part of a software application by the CMDB application mapping module. The CMDB application mapping module may provide a user interface that can allow users to map all components of their application via the user interface.

II. Monitoring Application Plug-In

The CMDB server 106 includes a monitoring application plugin module (shown as 546 in FIG. 5) that can provide a single user interface to manage monitoring configuration for a CI across one or more third-party monitoring software tools. Several third-party monitoring software tools are available to monitor CIs. However, a technical drawback with these third-party monitoring software tools is that they need to be individually configured to monitor the CIs within an IT network and third-party monitoring software tools often provide duplicate monitoring related information for a same CI. The monitoring application plugin module can overcome at least these technical drawbacks by providing a single application that can integrate with multiple third-party monitoring software tools.

The monitoring application plugin module can maintain the monitoring configurations of the CIs with an IT network from a single application. The monitoring configurations for CIs that are added or updated within an IT network are described at least in Section I of this patent document. In some embodiments, the payload generated by the CMDB application mapping module as described in Section I can be sent to the one or more monitoring software tools via the monitoring application plugin module so that the monitoring application plugin module can convert the payload to one or more formats that are acceptable to a corresponding one or more monitoring software tools. Each third-party monitoring software tool has its own pre-defined format, which can be stored in the CMDB server 106 and accessible to the monitoring application plugin module.

Figure 4:
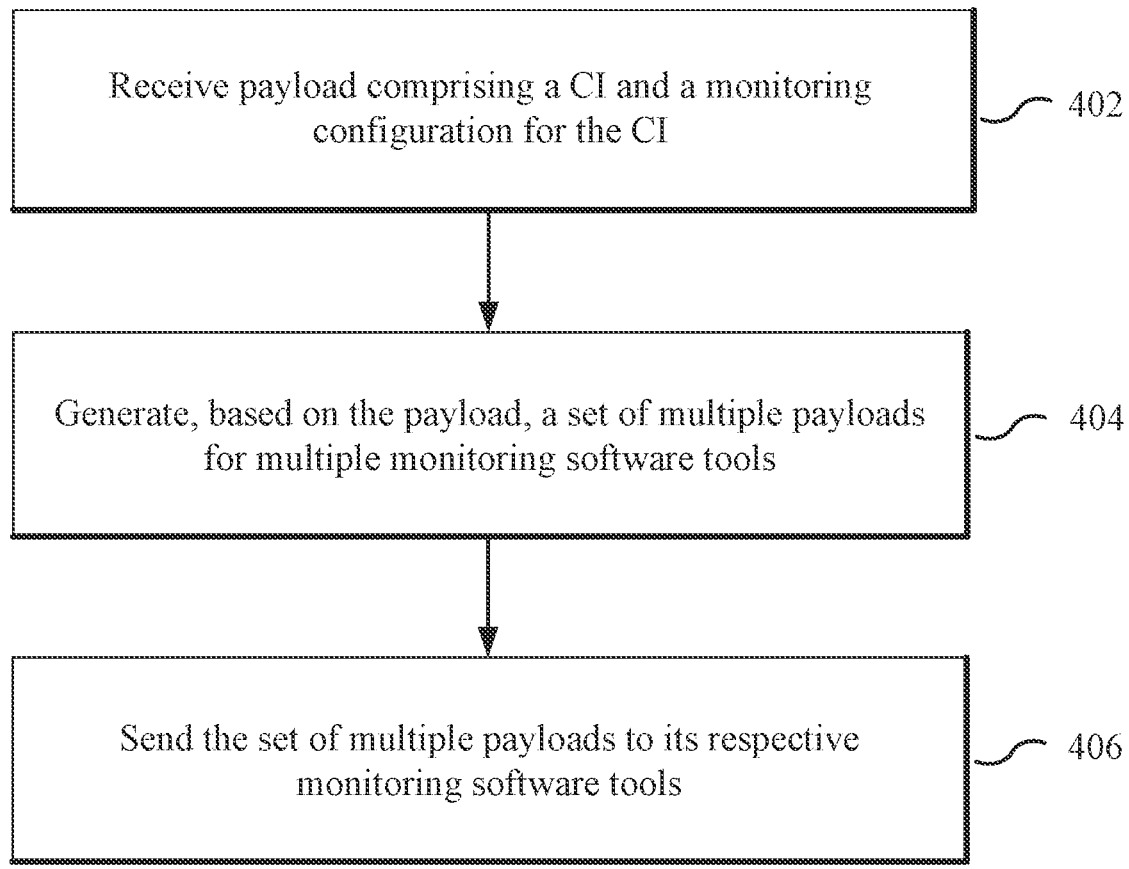
FIG. 4 shows an example flow diagram to convert a payload to be sent to multiple third-party monitoring software tools.

FIG. 4 shows an example flow diagram to convert a payload to be sent to multiple third-party monitoring software tools. At the receiving operation 402, the monitoring application plugin module can receive a payload from the CMDB application mapping module, where the payload comprising a CI and a monitoring configuration for the CI. At the generating operation 404, the monitoring application plugin module can generate a set of multiple payloads based on the received payload, where each payload (e.g., configuration item and/or monitoring configuration for the configuration item) of the set is generated using a format accepted by a corresponding third-party monitoring software tool. At the sending operation 406, the monitoring application plugin module can send the multiple generated payloads to its respective third-party monitoring software tools.

The monitoring application plugin module can store on a storage device (e.g., hard drive in CMDB server 106) the CIs and the associated monitoring configuration. The monitoring application plugin module can send the list of CIs along with their monitoring configuration to be shown on a graphical user interface (GUI) on a monitor/display.

Monitoring IT systems requires multiple monitoring applications for each technology layer that are used. Configuration of each third-party monitoring software tool can require several subject-matter experts having knowledge of the tool and access to configure monitoring definitions. Managing each tool through a single application can require a plugin so that each third-party monitoring software tool can be integrated with the single application. The techniques described in Section II for the monitoring application plugin module can be used to integrate a single application with third-party monitoring software tools without requiring extensive support from subject-matter experts. The monitoring application plugin module can integrate the single application with a plurality of monitoring software tools used to monitor CIs within the IT network. The integration occurs using plug-ins which can be updated over time as applications and features change over time. A beneficial feature of the monitoring application plugin module is that it can configure and maintain monitoring configuration definitions from a single application for CIs associated with a IT network.

III. Alert Notification

The CMDB server 106 includes an alert notification module (shown as 548 in FIG. 5) that can consolidate multiple alerts for a same CI provided by one or more third-party monitoring software tools from one or more servers 114. In some embodiments, more than one monitoring software tool can monitor a same CI operating in an IT network. For example, a monitoring configuration of a CPU utilization CI associated with a server may have a value of 90% for one monitoring software tool and 100% for another monitoring software tool. In this example, if both monitoring software tools determine that a CPU utilization is in fact 100%, then both monitoring software tools send alert messages to the CMDB server 106. The alert messages can indicate that the CPU of the server is operating at a utilization that is higher than the pre-determined threshold value in the monitoring configuration. In the above example, as further explained below, the alert notification module can receive both the alert messages, determine that both the alert messages are for the same server and for the same reason, and generate a single alert message that is sent to a computer (e.g., via email or text message) associated with an IT personnel responsible for the over-worked server.

Figure 6:
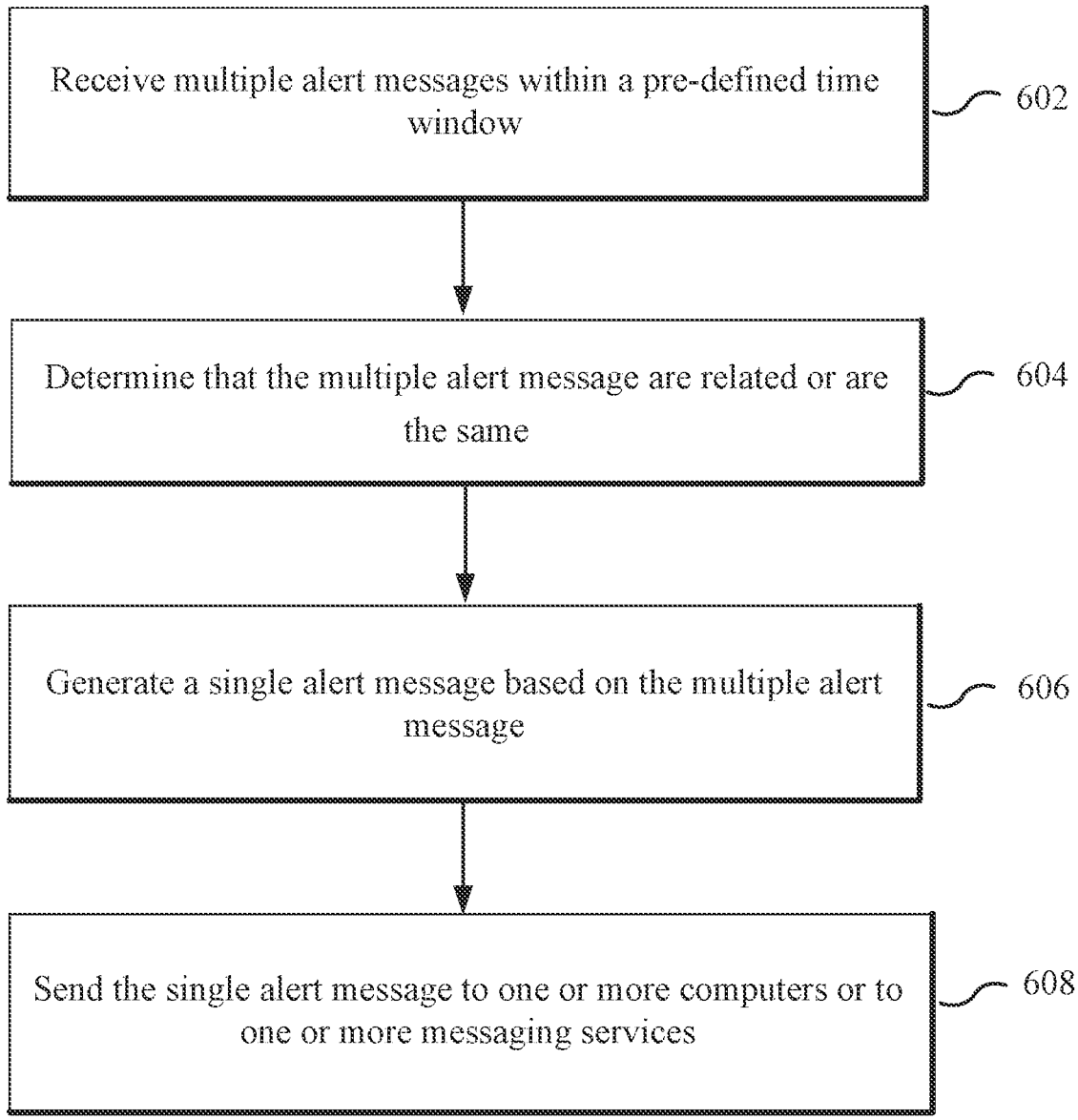
FIG. 6 shows an example flow diagram to manage multiple alert message for a same CI and sent for a same or similar reason.

FIG. 6 shows an example flow diagram to manage multiple alert message for a same CI and sent for a same or similar reason. At the receiving operation 602, the alert notification module receives multiple alert messages within a pre-defined time window (e.g., 5 minutes). At the determining operation 604, the alert notification module can determine that multiple alert messages are related to a same CI and for the same or similar reason by analyzing the contents of alert messages received within a pre-defined time window (e.g., 5 minute). The alert notification module can analyze, for example, the name of the CI included in the alert message or the reason for alert (e.g., message includes the text "CPU utilization is greater than a threshold value").

Based on analyzing alert messages received within the predefined time window, the alert notification module can determine that two or more alert messages received from two or more third-party monitoring software tools are related or are the same. In some embodiments, the alert notification module can determine that two or more alert message are related or are the same even if there may be slight differences in the content of the two alert messages but at least some of the content is the same. For example, a first alert message include an identifier for the CI as "Server #12" and can include a reason that states that "memory utilization is greater than a warning threshold," whereas a second alert message can include an identifier for the same "Server #1.2" and can include a reason that states that "memory utilization is 100%." In this example, the CI identifier and some of the text for the reason for the alert are the same.

At the generating operation 606, if the alert notification module determines that two or more alert message relate to the same CI and are sent by the third-party monitoring software tools for the same or similar reason. The alert notification module can generate a single alert message from multiple alert messages that relate to a same CI and for the same or similar reason. In some embodiments, the single alert message can be generated by copying a content of one of the multiple related alert messages. At the sending operation 608, the alert notification module can send the single alert message to one or more computers (e.g., desktop, mobile devices, etc.,) or to one or more messaging services (e.g., email or text messaging) associated with one or more persons that are considered responsible, accountable, consulted and/or informed (RACI) for the CI. In some embodiments, the CMDB (e.g., database 108) may include a list of contact information (e.g., email address or phone number) of one or more persons considered to be RACI for each CI stored on the CMDB. The alert notification message can obtain from the CMDB the contact information of the one or more persons to whom the single alert message should be sent for the CI for which multiple alert messages were received.

The techniques described in Section III for the alert notification module can allow users to subscribe to alerts they are interested in based on RACI concepts. The alert notification module can include a stored catalog of alerts with which users (e.g., developers or engineers) can select the type of alert that they would like to receive for a CI based on the monitoring configuration for that CI. Thus, by having the CMDB application mapping module catalog the monitoring configuration definitions in, for example the CMDB database, and by having the alert notification module catalog alerts, users can subscribe to alerts based on RACI concepts. Users can have flexibility to choose method of notification (e.g., via email or text message) and customized confirmation of each notification.

IV. Trending Events for CIs

The CMDB server 106 includes a trending module (shown as 550 in FIG. 5) that can generate a display to show a timeline of events for a CI. Events can describe operations of a CI at different points in time. Each event associated with a CI may include a text that describes the event (e.g., "CPU utilization alert message received") and a time when the event was generated (e.g., timestamp included in the alert message). In some embodiments, a database (e.g., CMDB 108 in FIG. 1) can include a history of events that have occurred for a CI. An event can include alert messages sent for the CI and, in some cases, consolidated by the alert notification module as described in Section III. An event may also describe when a CI was added to the IT network or updated in the IT network.

The database that includes the history of events for a particular CI can enable the trending module to query the database to obtain a set of events within a configurable time window (e.g., within the past 30 days) so that the tracking module can display on a GUI the events on a timeline. The CI related events shown on the timeline may include text that describes the events associated with that CI (e.g., "an incident ticket received").

The techniques described in Section IV for the trending module can provide information related to an "availability event" for CI. For example, any change event, alert, major incident, problem, and/or knowledge article about a CI can be considered an availability event for the CI. These events may not trend over long periods of time but can cause rework or repeated processes to be executed when they occur. The example trending module can present historical views of availability events over a configurable period of time so users can clearly view trends and historical data for each CI. As part of the CMDB updates based on the machine learning algorithms, the trending module can store availability event data for each CI in the CMDB. Users can use a GUI to view availability events for each CI. In some embodiments, the availability events for a CI may be displayed on a GUI in a timeline with multiple rows (where the timeline is in a vertical configuration) or with multiple columns (where the timeline is in a horizontal configuration) so that each row or column can be associated with each type of availability event. In such embodiments, each availability event type can have its own lane and each event can have a callout along the timeline. The user may use the GUI to scroll the timeline to view events when they occurred. Users can double click an event associated with the timeline to drill down into the event for more detailed information.

Figure 5:
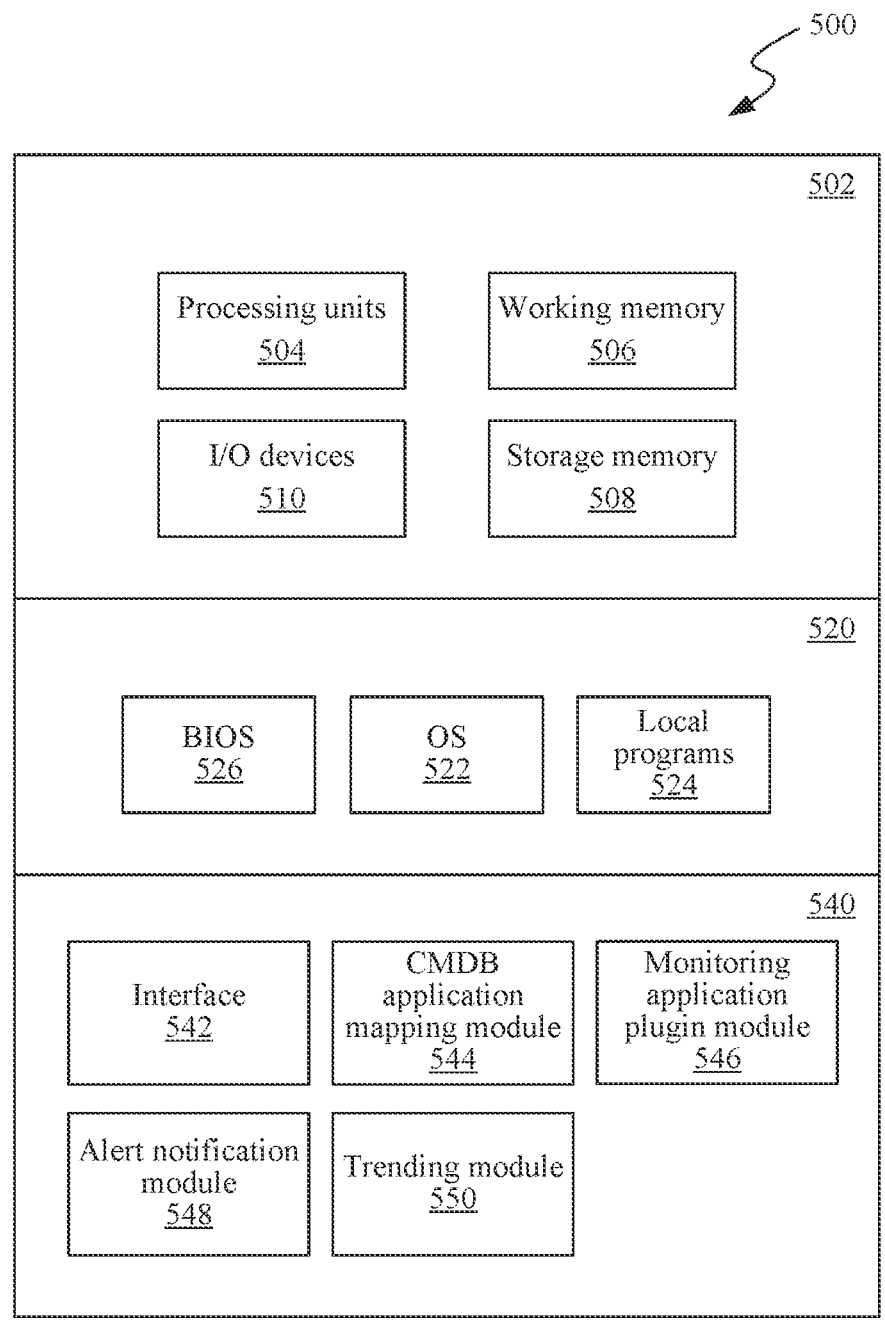
FIG. 5 is a block diagram illustrating components which, in some implementations, can be used in a system employing the disclosed technology.

FIG. 5 is a block diagram illustrating components which, in some implementations, can be used in a system employing the disclosed technology. The components 500 include hardware 502, general software 520, and specialized components 540. A system implementing the disclosed technology can use various hardware, including processing units 504 (e.g., CPUs, GPUs, APUs, etc.), working memory 506, storage memory 508, and input and output devices 510. Some or all of the components 500 can be implemented on a server, such as a CMDB server. For example, a memory may store instructions that upon execution by the processing units 504 configure the CMDB server to perform the operations described for the CMDB application mapping module 544, monitoring application plugin module 546, alert notification module 548, and the trending module 550 in FIGS. 1 to 4, 6 and 7 and/or in the various embodiments described in this patent document.

General software 520 can include various applications, including an operating system 522, local programs 524, and a basic input output system (BIOS) 526. Specialized components 540 can be subcomponents of a general software application 520, such as local programs 524. Specialized components 540 can include CMDB application mapping module 544, monitoring application plugin module 546, alert notification module 548, and/or the trending module 550. In some implementations, components 500 can be in a computing system that is distributed across multiple computing devices or can be an interface to a server-based application executing one or more of specialized components 540.

Figure 7:
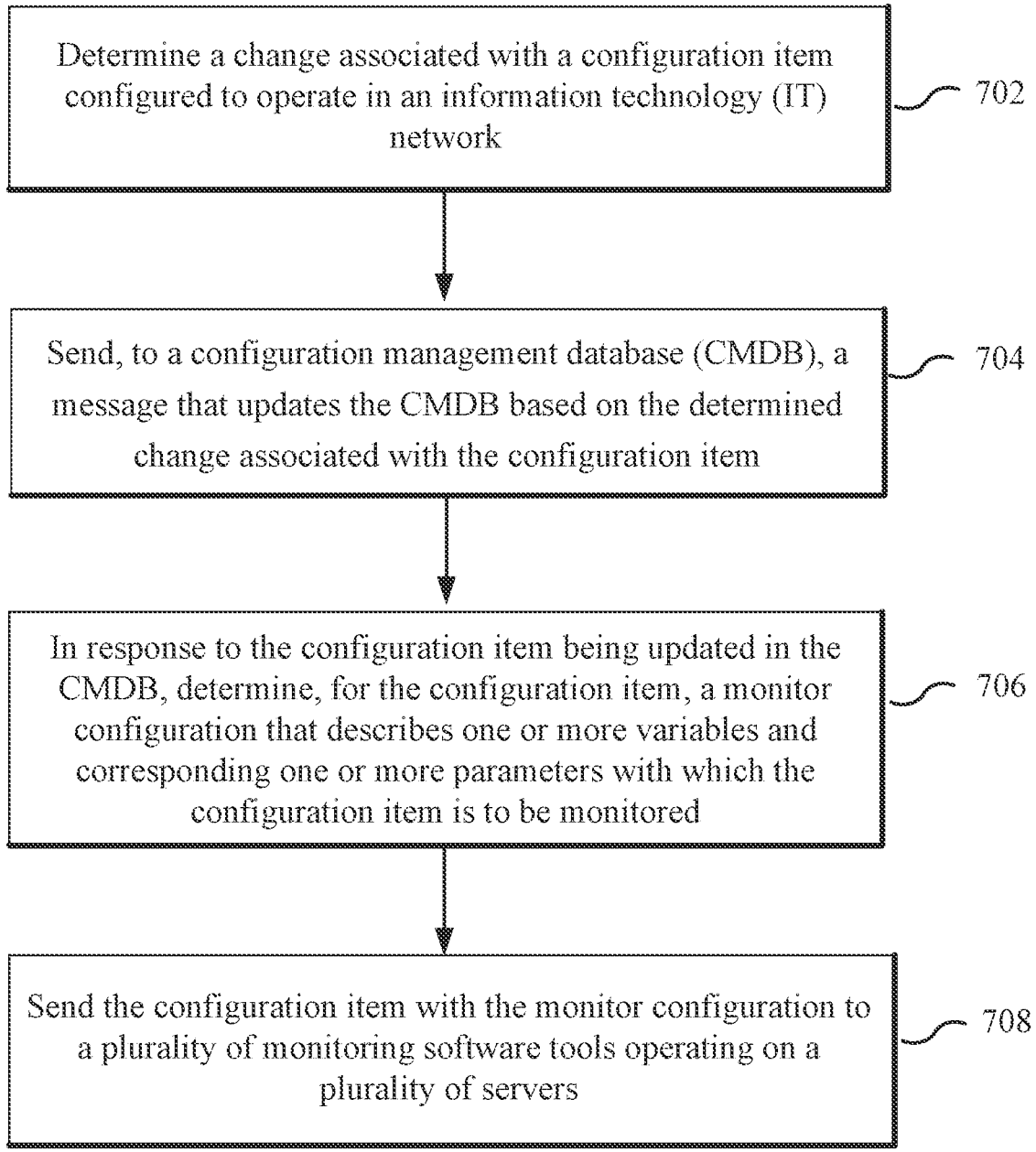
FIG. 7 shows an example flow diagram to track events associated with a CI

FIG. 7 shows an example flow diagram to track events associated with a CI. At the determining operation 702, a CMDB application mapping module can determine a change associated with a configuration item configured to operate in an information technology (IT) network. The configuration item describes a hardware component or a software component that is configured to operate in the IT network. At the sending operation 704, the CMDB application mapping module can send, to a configuration management database (CMDB), a message that updates the CMDB based on the determined change associated with the configuration item.

At the determining operation 706, the CMDB application mapping module can, in response to the configuration item being updated in the CMDB, determine, for the configuration item, a monitor configuration that describes one or more variables and corresponding one or more parameters with which the configuration item is to be monitored. At the sending operation 708, the CMDB application mapping module can send the configuration item with the monitor configuration to a plurality of monitoring software tools operating on a plurality of servers, where each monitoring software tool is configured to monitor the configuration item based on the monitor configuration.

In some embodiments, the method of FIG. 7 further includes an alert notification module of a server that receives a plurality of alert messages from the plurality of monitoring software tools within a pre-determined time window, where the alert messages indicate that the configuration item and one or more additional configuration items are operating in a critical or dangerous condition; determines, by analyzing contents of the plurality of alert messages, that at least sonic of the plurality of alert messages describe the critical or dangerous condition of the configuration item; generates a single alert message for the configuration item by combining the at least some of the plurality of alert messages; and sends the single alert message to one or more computers or to one or more messaging services associated with one or more persons that maintain or manage the configuration item.

In some embodiments, the at least some of the plurality of alert messages are determined to describe the critical or dangerous condition of the configuration item by determining that the at least some of the plurality of alert messages include a same identifier (e.g., name or unique identifier) of the configuration item and a same reason for indicating that the configuration item is operating in the critical or dangerous condition. In some embodiments, the method of FIG. 7 further includes obtaining a set of events associated with the configuration item that fall within a configurable time window, where the set of events describe operations of the configuration time at different points in time, and where each event includes a description of an event and a time when the event occurred; and sending, to a display, a timeline comprising the set of events for the configuration item, wherein a length of the timeline corresponds to the configurable time window In some embodiments, the change associated with the configuration item includes the configuration item being newly added to the IT network or the configuration item being updated. In some embodiments, the configuration item is determined to be newly added to the IT network by a server being configured to: identify presence of one or more key terms within a software code or the log message associated with the configuration item, where the presence of the one or more key terms indicate that the configuration item is newly added to the IT network, and where the one or more key terms include a name of the configuration item or an identifier associated with a user of the configuration item; and send, to the CMDB, the message that adds the newly added configuration item to the CMDB.

In some embodiments, the configuration item is determined to be updated by the server being configured to: determine that the configuration item is updated by comparing the software code to a previous version or a default version of the software code; and send, to the CMDB, the message that updates a previous version of the configuration item stored in the CMDB with the updated configuration item. In some embodiments, the server is further configured to: receive, from CMDB, a second message that indicates that the configuration item is newly added to the CMDB. In some embodiments, the configuration item includes a server, a database, a web service, a laptop, a networking device, a phone, or a virtual machine.

In some embodiments, the monitoring application plugin module of the server generates multiple payloads corresponding to the plurality of monitoring software tools, where the configuration item with the monitor configuration is sent to the plurality of monitoring software tools via the multiple payloads, where each payload is sent to a corresponding one of the monitoring software tools, and where each payload comprises the configuration item and the monitor configuration in a format accepted by the corresponding one of the monitoring software tools.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a. computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method comprising:
   determining a change to a configuration item configured to operate in an information technology (IT) network, wherein the change to the configuration item is determined using machine learning to identify at least one key term within software code of the configuration item indicating the change;
   in response to determining the change to the configuration item,
      sending, to a configuration management database (CMDB), a message that updates the CMDB based on the change to the configuration item; and
      sending a monitor configuration for the configuration item to a plurality of monitoring software tools operating on a plurality of servers, wherein each monitoring software tool is configured to monitor the configuration item based on the monitor configuration.

2. The method of claim 1, further comprising:
   receiving a plurality of alert messages from the plurality of monitoring software tools within a pre-determined time window, wherein the plurality of alert messages include an identifier of the configuration item and indicate the configuration item is operating in a condition above a threshold;
   determining, by analyzing contents of the plurality of alert messages, that at least two of the plurality of alert messages describe the condition of the configuration item;
   generating a single alert message for the configuration item by combining the at least two of the plurality of alert messages; and
   sending the single alert message to one or more computers that maintain or manage the configuration item.

3. The method of claim 1, further comprising:
   obtaining a set of events that fall within a configurable time window,
      wherein the set of events describe operations of the configuration item at different points in time, and
      wherein each event includes a description of an event and a time when the event occurred; and
   sending, to a display, a timeline comprising the set of events for the configuration item, wherein a length of the timeline corresponds to the configurable time window.

4. The method of claim 1, further comprising:
   identifying presence of one or more key terms within a software code associated with the configuration item,
      wherein the presence of the one or more key terms indicate that the configuration item is newly added to the IT network, and
      wherein the one or more key terms include a name of the configuration item or an identifier associated with a user of the configuration item; and
   sending, to the CMDB, the message that adds the newly added configuration item to the CMDB.

5. The method of claim 1, further comprising:
   determining that the configuration item is updated by comparing the software code to a previous version or a default version of the software code; and
   sending, to the CMDB, the message that updates a previous version of the configuration item stored in the CMDB with the updated configuration item.

6. The method of claim 1, further comprising:
   receiving, from the CMDB, a second message that indicates that the configuration item is newly added to the CMDB.

7. The method of claim 1, wherein the change associated with the configuration item includes the configuration item being newly added to the IT network or the configuration item being updated.

8. A system comprising:
   one or more processors; and
   one or more memories storing instructions that, when executed by the one or more processors, cause the system to perform a process comprising:
      determining a change to a configuration item configured to operate in an information technology (IT) network,
         wherein the change to the configuration item is determined using machine learning to identify at least one key term within software code of the configuration item indicating the change;
      in response to determining the change to the configuration item,
         sending, to a configuration management database (CMDB), a message that updates the CMDB based on the change to the configuration item; and
         sending a monitor configuration for the configuration item to a plurality of monitoring software tools operating on a plurality of servers, wherein each monitoring software tool is configured to monitor the configuration item based on the monitor configuration.

9. The system according to claim 8, wherein the process further comprises:
   receiving a plurality of alert messages from the plurality of monitoring software tools within a pre-determined time window, wherein the plurality of alert messages include an identifier of the configuration item and indicate the configuration item is operating in a condition above a threshold;
   determining, by analyzing contents of the plurality of alert messages, that at least two of the plurality of alert messages describe the condition of the configuration item;
   generating a single alert message for the configuration item by combining the at least two of the plurality of alert messages; and
   sending the single alert message to one or more computers that maintain or manage the configuration item.

10. The system according to claim 8, wherein the process further comprises:
obtaining a set of events that fall within a configurable time window,
wherein the set of events describe operations of the configuration item at different points in time, and
wherein each event includes a description of an event and a time when the event occurred; and
sending, to a display, a timeline comprising the set of events for the configuration item, wherein a length of the timeline corresponds to the configurable time window.

11. The system according to claim 8, wherein the process further comprises:
identifying presence of one or more key terms within a software code associated with the configuration item,
wherein the presence of the one or more key terms indicate that the configuration item is newly added to the IT network, and
wherein the one or more key terms include a name of the configuration item or an identifier associated with a user of the configuration item; and
sending, to the CMDB, the message that adds the newly added configuration item to the CMDB.

12. The system according to claim 8, wherein the process further comprises:
determining that the configuration item is updated by comparing the software code to a previous version or a default version of the software code; and
sending, to the CMDB, the message that updates a previous version of the configuration item stored in the CMDB with the updated configuration item.

13. The system according to claim 8, wherein the process further comprises:
receiving, from the CMDB, a second message that indicates that the configuration item is newly added to the CMDB.

14. The system according to claim 8, wherein the change associated with the configuration item includes the configuration item being newly added to the IT network or the configuration item being updated.

15. A non-transitory computer-readable medium storing instructions that, when executed by a computing system, cause the computing system to perform operations comprising:
determining a change to a configuration item configured to operate in an information technology (IT) network, wherein the change to the configuration item is determined using machine learning to identify at least one key term within software code of the configuration item indicating the change;
in response to determining the change to the configuration item,
sending, to a configuration management database (CMDB), a message that updates the CMDB based on the change to the configuration item; and
sending a monitor configuration for the configuration item to a plurality of monitoring software tools operating on a plurality of servers, wherein each monitoring software tool is configured to monitor the configuration item based on the monitor configuration.

16. The non-transitory computer-readable medium of claim 15, wherein the operations further comprise:
receiving a plurality of alert messages from the plurality of monitoring software tools within a pre-determined time window, wherein the plurality of alert messages include an identifier of the configuration item and indicate the configuration item is operating in a condition above a threshold;
determining, by analyzing contents of the plurality of alert messages, that at least two of the plurality of alert messages describe the condition of the configuration item;
generating a single alert message for the configuration item by combining the at least two of the plurality of alert messages; and
sending the single alert message to one or more computers that maintain or manage the configuration item.

17. The non-transitory computer-readable medium of claim 15, wherein the operations further comprise:
obtaining a set of events that fall within a configurable time window,
wherein the set of events describe operations of the configuration item at different points in time, and
wherein each event includes a description of an event and a time when the event occurred; and
sending, to a display, a timeline comprising the set of events for the configuration item, wherein a length of the timeline corresponds to the configurable time window.

18. The non-transitory computer-readable medium of claim 15, wherein the operations further comprise:
identifying presence of one or more key terms within a software code associated with the configuration item,
wherein the presence of the one or more key terms indicate that the configuration item is newly added to the IT network, and
wherein the one or more key terms include a name of the configuration item or an identifier associated with a user of the configuration item; and
sending, to the CMDB, the message that adds the newly added configuration item to the CMDB.

19. The non-transitory computer-readable medium of claim 15, wherein the operations further comprise:
determining that the configuration item is updated by comparing the software code to a previous version or a default version of the software code; and
sending, to the CMDB, the message that updates a previous version of the configuration item stored in the CMDB with the updated configuration item.

20. The non-transitory computer-readable medium of claim 15, wherein the change associated with the configuration item includes the configuration item being newly added to the IT network or the configuration item being updated.

* * * * *